United States Patent [19]

Nehl

[11] Patent Number: 5,012,922
[45] Date of Patent: May 7, 1991

[54] CONTAINER FOR RECEIVING A CASSETTE WITH A TAPE-LIKE RECORDING MEDIUM

[75] Inventor: Wolfgang Nehl, Tumlingen, Fed. Rep. of Germany

[73] Assignee: fischerwerke Artur Fischer GmbH & Co. Kg., Waldachtal/Tumlingen, Fed. Rep. of Germany

[21] Appl. No.: 487,775

[22] Filed: Mar. 2, 1990

[30] Foreign Application Priority Data

Mar. 2, 1989 [DE] Fed. Rep. of Germany ....... 3906605

[51] Int. Cl.$^5$ .......................................... B65D 85/672
[52] U.S. Cl. ..................................... 206/387; 220/346
[58] Field of Search ............... 206/309, 387; 220/345, 220/346, 347; 312/9, 15, 16

[56] References Cited

U.S. PATENT DOCUMENTS

| | | | |
|---|---|---|---|
| 4,046,255 | 9/1977 | Ackeret | 206/387 |
| 4,113,098 | 9/1978 | Howard | 220/345 X |
| 4,538,729 | 9/1985 | Ackeret | 220/347 X |
| 4,561,544 | 12/1985 | Reeve | 220/346 X |
| 4,632,248 | 12/1986 | Hsu | 220/347 X |
| 4,743,077 | 5/1988 | Bohnet et al. | 206/387 X |
| 4,856,653 | 8/1989 | Ackeret | 312/9 X |
| 4,932,526 | 6/1990 | Nehl et al. | 206/387 |

FOREIGN PATENT DOCUMENTS 2248408 1/1974 Fed. Rep. of Germany .
2343487 3/1974 Fed. Rep. of Germany .
8423125 1/1986 Fed. Rep. of Germany .

Primary Examiner—Steven N. Meyers
Assistant Examiner—Jacob K. Ackun, Jr.
Attorney, Agent, or Firm—Michael J. Striker

[57] ABSTRACT

A container for receiving a cassette with a tape-like recording medium, and comprising a rectangular housing, a transporting slide member for supporting the cassette and movable along the side wall of the housing for advancing the cassette to a position at which the cassette is removed and a spring supported in the housing for advancing the transporting slide member to the position at which the cassette is removed. A retaining arrangement is provided for retaining the transporting slide member. The retaining arrangement includes a leaf spring secured to the slider member, extending in a direction of movement thereof, and having a free end, a tooth secured at the free end of the leaf spring for engaging the housing to retain the transporting slide member therein, and a finger-actuatable push-button for releasing the transporting slide member upon application of finger pressure to the push-button. A counter-supporting member is secured to a portion of the side wall of the housing. A snap hook is arranged on the side of the push-button opposite the portion of the side wall of said housing to which the counter-supporting member is secured, for snapping over the counter-supporting member for holding the push-button in a disengaged position thereof and for snapping under the counter-supporting member when the transporting slide member is advanced into the housing.

8 Claims, 3 Drawing Sheets

CONTAINER FOR RECEIVING A CASSETTE WITH A TAPE-LIKE RECORDING MEDIUM

BACKGROUND OF THE INVENTION

The invention relates to a container for receiving a cassette with a tape-like recording medium. The container comprises a box-like housing and a spring biased movable slider member or members for advancing the cassette.

Containers for receiving cassettes with magnetic tapes and which comprise a box-like housing into which the cassettes can be introduced by the slider members and kept for storage, are known. In order to remove the cassettes, a slider member located in the housing, is advanced out of the housing by a spring and exposes the cassette lying on it for removal.

DE-PS 2 248 408 discloses a container for receiving a cassette with a tape-like recording medium and in which the slider member located in the housing, is advanced out of the housing by a spring force as a result of actuation with a finger a bush-button located on an end wall of the slider member. The pressure of the finger on the push-button causes disengagement of a tooth located on a resilient bar, from a recess provided in the housing floor and in which the tooth was engaged. Thus, the slider member is brought into a position for removal of the cassette. The resilient bar with the tooth located on it is formed on the underside of the slider member and is connected with the push-button. If the push-button is pressed for a relatively long time, however, the tooth on the resilient bar re-engages the recess in the housing floor. As a result, the slider member is prevented from being brought into the position for removal of the cassette. In order to remove the cassette, it is, therefore, often necessary to actuate the push-button several times. This makes handling of the cassette-receiving container more difficult and complicated.

SUMMARY OF THE INVENTION

The object of the invention is to provide a container for receiving a cassette with a tape-like recording medium in which the removal of the cassette is achieved by a simple maneuver that ensures a more reliable unlocking of the transporting slider member.

The object of the invention is achieved by providing on a side of the push-button that faces the lateral inner wall of the housing, a snap hook that engages a counter-supporting member when the push-button is depressed. The counter-supporting member is located on the inner wall opposite the snap hook and holds the push-button in a disengaged position thereof.

Due to the arrangement of a snap hook on the side of the push-button that faces towards the inner wall of the housing, and of a counter-holding member on the inner wall of the housing, the slider member is unlocked when the push-button is actuated, as a result of snapping of the snap hook over the counter-supporting member, the snap hook holds the push-button in an unlocked position and, at the same time, prevents the tooth located on a leaf spring of the slider member from re-engaging the recess in the container housing floor. When the transporting member is pushed in, the snap hook is deflected because of oblique surfaces of the hook and of the counter-supporting member. As a result the snap hook snaps under the counter-supporting member when the tooth located on the leaf spring, engages the recess in the container housing floor.

The peg formed in the lower region of the snap hook preferably has in its rear region facing the housing, an oblique surface. When the transporting slider member is returned into the housing, this oblique surface, together with an oblique surface formed on the underside of a rail forming the counter-supporting member, facilitates the engagement of the snap hook under the counter-supporting member.

In order to provide for engagement and disengagement discussed above, the snap hook may be arranged resiliently on the side of the push-button, while the counter-supporting member is fixedly attached to the housing.

According to another embodiment, however, the snap hook may be fixed on the side of the push-button, and the counter-supporting member may be arranged on a resilient portion of the side wall of the housing. The resilience of the respective portion of the side wall is made possible by not rigidly attaching the side wall of the housing in that region to the floor of the housing.

In a still another embodiment according to the invention, the snap hook is rigidly mounted on the side of the push-button, and the counter-supporting member is attached to a resilient tongue which is formed by separating this region of the side wall of the housing from the remaining region of the housing by two cut-out portions.

The invention both as to its construction so to its mode of operation, together with additional objects and advantages thereof, will be best understood from the following detailed description of the preferred embodiments with reference to the accompanying drawings.

DETAILED DESCRIPTION OF THE PREFERRED EMBODIMENTS

Figure 1:
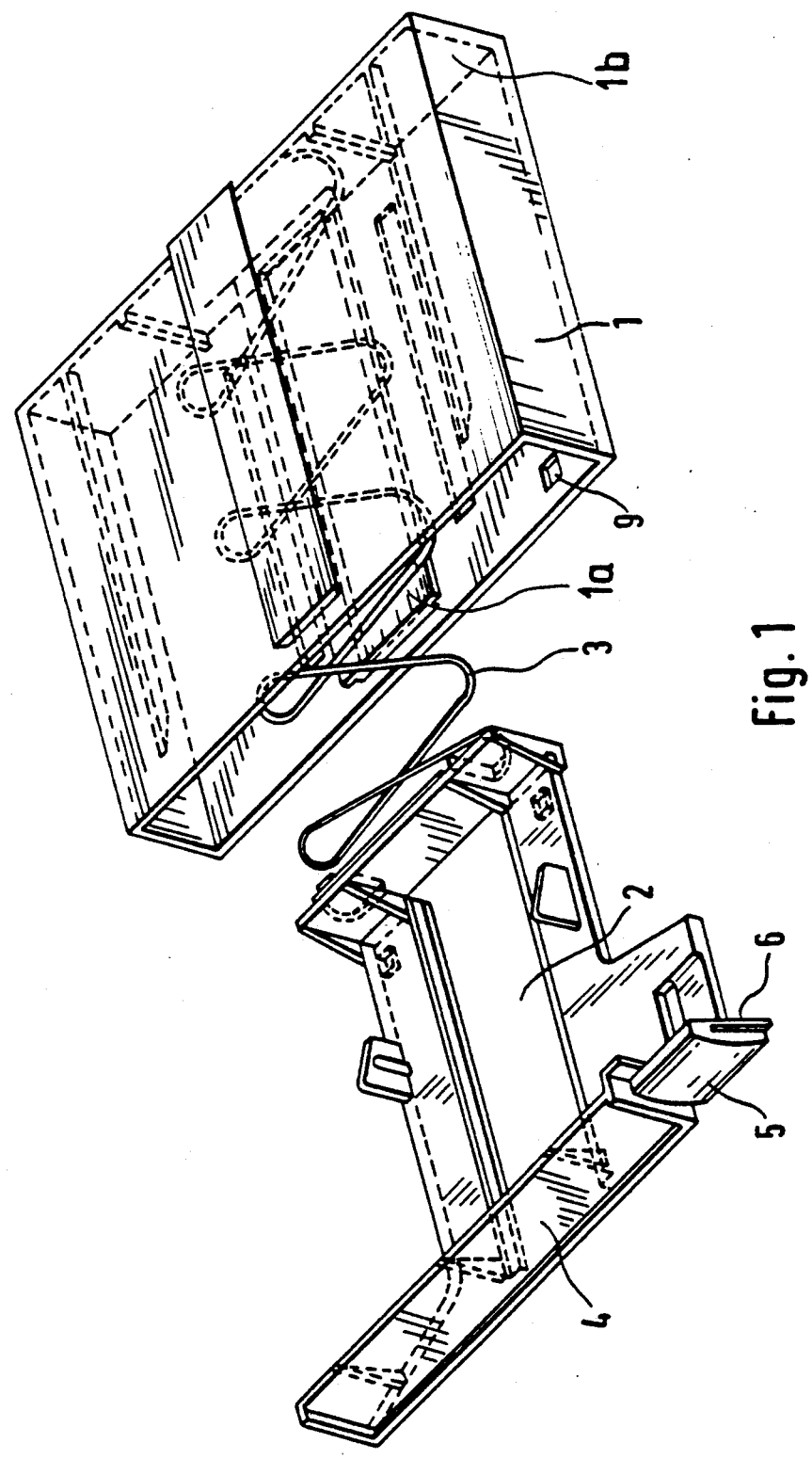
FIG. 1 shows an exploded view of a container according to the invention with the transporting slider member being removed.

The container shown in FIG. 1 comprises a housing 1 for receiving a cassette which is not shown in the drawing. A transporting slider member 2 on which the cassettes are placed is movable in the housing 1 along a guide 1a. A spring 3 supported in the housing 1 between area wall 1b of the housing and the slider member 2 advances the transporting slider member 2 out of the housing 1. An outer cover 4 located on the end face of the transport slider member 2 protects the cassette received in the container from outside influences. Arranged in the region of the end face of the transporting slider member 2 is a push-button 5. A snap hook 6 is arranged on one lateral outer surface of the push-button 5. The snap hook 6 is formed as a resilient bar located on the push-button 5.

Figure 2:
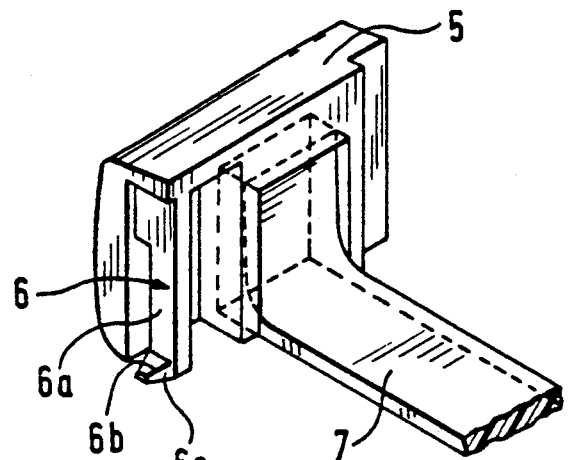
FIG. 2 shows a perspective view of the push-button with a snap hook arranged thereon.
Figures 3A, 3B, 3C:
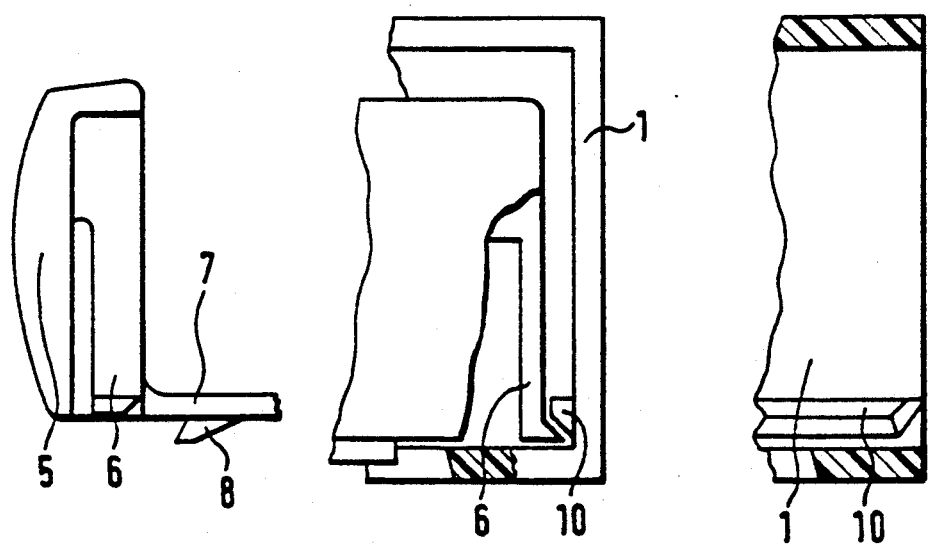
FIG. 3a shows a partial side elevational view of a push-button according to the invention.
FIG. 3b shows a partial plan view of a portion of the container housing with a snap hook according to the invention.
FIG. 3c shows a partial cross-sectional view of a portion of the container housing with an attached counter-supporting member.

FIG. 2 shows the push-button 5 with a leaf spring 7. A tooth (not shown in FIG. 2) is arranged on the underside of the leaf spring 7. In the locked position, the tooth 8, which is shown in FIG. 3a, engages in a recess 9, shown in FIG. 1, in the floor of the housing 1. The snap hook 6 comprises a bar 6a in the lower region of which is formed a peg 6b that extends at an angle to the bar sloping downward and outward. An oblique surface 6c located on the back of the peg 6b facilitates snapping of the snap hook 6 under the counter-supporting member when the transporting slider member 2 is advanced into the housing 1.

FIG. 3b shows a partial plan view of the snap hook 6 and a portion of the housing 1 where the snap hook is arranged. In the lower region of the housing 1 opposite the snap hook 6, a counter-supporting member 10 is fixedly arranged. The counter-supporting member 10 comprising, as shown in FIG. 3c a rail having on its underside a flattened oblique surface which, when the transporting member 2 is pushed into the housing 1, facilitates snapping of the snap hook 6 under the counter-supporting member 10.

Figure 4:
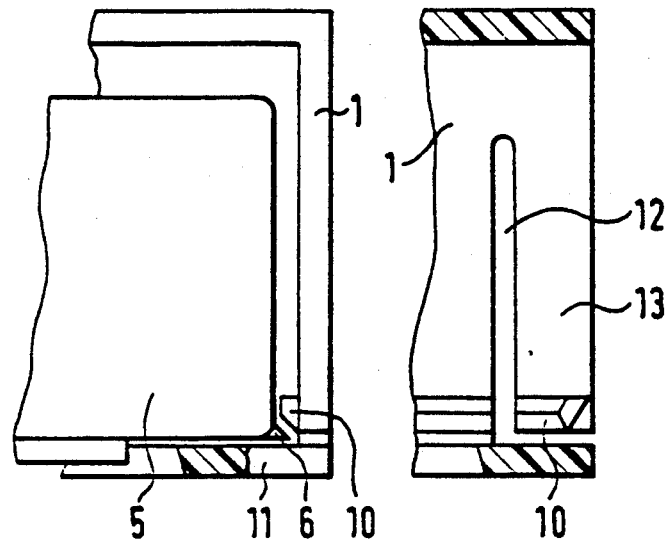
FIG. 4a shows a partial side view of a portion of a push-button with a snap hook fixedly attached to a side of the push-button, and a portion of the container housing with a counter-supporting member.
FIG. 4b shows a partial cross-sectional view of a portion of the container housing with a resilient wall portion to which the counter-supporting member is attached.

In the embodiment shown in FIG. 4a, the snap hook 6 is fixedly attached to the side of the push-button 5 which faces the side wall of the housing 1. The counter-supporting member 10 is resiliently attached to a portion of the housing 1 which is not connected to the floor 11 of the housing 1. The resilience of the counter-supporting member is achieved by providing a resilient wall portion 13 formed by a cut-out 12, in the lower region of which resilient portion, the counter-holding member 10 is arranged. As a result the counter-holding member 10 in this embodiment is a resilient element.

Figure 5:
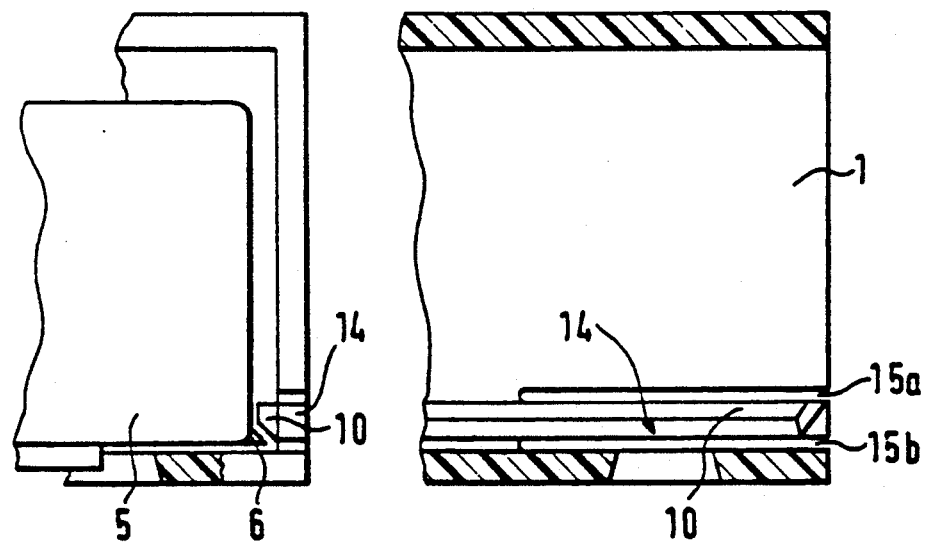
FIG. 5a shows a view similar to that of FIG. 4a but in which the counter-supporting member is attached to a resilient tongue.
FIG. 5b shows a view similar to that of FIG. 4b but in which the resilient portion of the housing wall is formed by two cut-outs.

FIG. 5a shows an embodiment in which the snap hook 6 is fixedly attached to the side of the push-button 5. The counter-supporting member 10, which in this embodiment is also mounted resiliently, is arranged on a resilient tongue 14 which is formed by two cut-outs 15a, 15b of the side wall of the housing 1.

While the invention has been illustrated and described as embodied in a container for receiving a cassette with a tape-like recording medium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A container for receiving a cassette with a tape-like recording medium, said container comprising a rectangular housing having a rear wall and a side wall; a transporting slider member for supporting the cassette and movable between a storage position in which the cassette is stored in said housing and a cassette removal position, said housing including means for supporting said transporting slider member for movement along said side wall between the storage and cassette removal positions; spring means supported in said housing between said rear wall and said transporting slider member for advancing said transporting slider member from the storage position to the cassette removal position; and means for retaining said transporting slider member in said housing in the storage position of said transporting slider member, said transporting slider member including a finger-actuatable push-button which releases said transporting slider member upon application of the finger pressure to said push-button and having a side wall facing said side wall of said housing; said retaining means comprising a leaf spring connected with said push-button, extending in a direction of movement of said transporting slider member between the storage and cassette removal positions, and having a free end, a tooth secured at said free end of said leaf spring and which engages an aperture in said housing to retain said transporting slider member therein, a counter-supporting member secured to a portion of said wall of said housing, and a snap hook which is arranged on said side of said push-button opposite said portion of said side wall of said housing, and which snaps over said counter-supporting member, and holds said push-button in a disengaged position thereof when said push-button is actuated, and which snaps under said counter-supporting member when said transporting slider member is advanced into said housing.

2. A container as set forth in claim 1, wherein said snap hook includes a bar extending transverse to a plane of movement of said transporting slider member and having a lower portion, and a peg projecting from said lower portion at an angle to the plane of movement of said transporting slider member.

3. A container as set forth in claim 3, wherein said peg has in a rear region thereof an oblique surface facing said side wall of the housing.

4. A container as set forth in claim 1, wherein said counter supporting member comprises a rail extending along said side wall of said housing.

5. A container as set forth in claim 4, wherein said rail has on an underside thereof an oblique surface inclined downward towards said side wall of said housing.

6. A container as set forth in claim 1, wherein said snap hook is resiliently attached said side of said push-button, and said counter-supporting member is fixedly attached to said housing.

7. A container as set forth in claim 1, wherein said snap hook is fixedly secured to said side of said push-button, and said side wall of said housing has a resilient portion defined by a cut-out consisting of a first portion that separates said side wall from a floor of said housing, and a second portion extending substantially perpendicular to said first portion, said counter-supporting member being secured to said resilient portion.

8. A container as set forth in claim 1, wherein said snap hook is fixedly secured to said side of said push-button, and said side wall of said housing has a resilient tongue portion defined by two spaced cut-outs provided in said side wall, parallel to the direction of movement of said transporting slider member, said counter-supporting member being secured to said resilient tongue portion.

* * * * *